United States Patent [19]

Mantel

[11] Patent Number: 5,070,484
[45] Date of Patent: Dec. 3, 1991

[54] SONIC DIRECTION LOCATING SYSTEM

[76] Inventor: Juval Mantel, Inninger Strasse 7A, 8000 Munich 70, Fed. Rep. of Germany

[21] Appl. No.: 585,569

[22] Filed: Sep. 20, 1990

[30] Foreign Application Priority Data

Sep. 29, 1989 [DE] Fed. Rep. of Germany ....... 3932620

[51] Int. Cl.⁵ .............................................. G01S 3/80
[52] U.S. Cl. ..................................... 367/124; 367/135
[58] Field of Search ............... 367/118, 123, 124, 127, 367/129, 135, 153

[56] References Cited

U.S. PATENT DOCUMENTS

4,525,816  6/1985  Crowther ........................... 367/123
4,661,938  4/1987  Jones et al. ........................ 367/123

Primary Examiner—Daniel T. Pihulic
Attorney, Agent, or Firm—Benjamin J. Barish

[57] ABSTRACT

A sonic direction locating system for locating the direction of origin of a specified type of sonic impulse with respect to a reference body, includes a plurality of sonic sensors arranged in a predetermined array to be located at the reference body, and a direction processor for processing the outputs of the sonic sensors to determine the direction of a sonic impulse detected by the sonic sensors according to their positions in the array. The outputs of the sonic sensors are analyzed for predetermined characteristics stored in a storage device, and the direction processor is immediately disabled when one of the predetermined characteristics of the detected sonic impulse does not correspond to a stored characteristic.

33 Claims, 9 Drawing Sheets

SONIC DIRECTION LOCATING SYSTEM

FIELD AND BACKGROUND OF THE INVENTION

The present invention relates to a sonic direction locating system for locating the direction of the origin of a specified type of sonic impulse with respect to a reference body. As used herein, the term "sonic impulse" refers to a sonic (includes ultrasonic) wave of very short duration; and the term "sonic sensor" includes microphones for airborne sounds, hydrophones for water-borne sounds, and geophones for solids-borne sounds.

Many systems have been developed and are described in the literature for locating the direction of the origin of sonic impules with respect to a body. In general, the known systems utilize many sonic sensors located at relatively large distances from each other (e.g., from 30 to 100 meters), and measure the arrival times of the sonic impulse to the various sonic detectors for determining the direction of the origin of the sonic impulse. In addition to the large space requirements, the known sonic direction locating systems generally have a relatively high rate of false alarms in correctly identifying the sonic impulse desired to be located and distinguishing it from background noises.

OBJECT AND BRIEF SUMMARY OF THE INVENTION

An object of the present invention is to provide a sonic direction locating system which may be constructed to occupy a relatively small volume so that it can be carried on a relatively small reference body, such as on the body of a person or on a small vehicle, as well as on relatively large reference bodies, such as on relatively large land vehicles, aircraft or seacraft.

Another object of the present invention is to provide a sonic direction locating system which more effectively distinguishes the sonic impulse desired to be detected from background noises, and which is capable of providing a relatively small rate of false alarms.

According to the present invention, there is provided a sonic direction locating system for locating the direction of origin of a specified type of sonic impulse with respect to a reference body, comprising: a plurality of sonic sensors arranged in a predetermined array to be located at the reference body; direction processing means for processing the outputs of the sonic sensors to determine the direction of a sonic impulse detected by the sonic sensors according to the positions in the array of the first sonic sensors detecting the sonic impulse; storage means for storing predetermined characteristics of the specified type of sonic impulse to be located; sound analyzing means connected to receive the outputs of said sonic sensors for analyzing same for said predetermined characteristics thereof; and disabling means for disabling the direction processing means immediately in response to a determination by the sound analyzing means that the detected sonic impulse does not correspond to that of the specified sonic impulse stored in the storage means.

According to a more particular aspect of the invention, the direction processing means includes means effective, upon the detection of a sonic impulse by one of the sonic sensors, to block the outputs of at least some of the sonic sensor from being processed by the direction processing means.

A number of embodiments of the invention are described below for purposes of example.

In one described embodiment, the plurality of sonic sensors are arranged in a circular array; the direction processing means including means effective, upon the detection of a sonic impulse by one of the sonic sensors, to block the outputs of all the other sonic sensors except the two diametrically opposite sensors located 90° from the one sonic sensor in the circular array.

According to a further feature particularly, but no exclusively useful in the latter embodiment, the direction processing means comprises a coarse-direction processor for determining the coarse direction of the detected sonic impulse according to the position in the array of the sonic sensor first detecting the sonic impulse; and a fine-direction processor for determining the fine direction of the detected sonic impulse according to the outputs of the two diametricallyopposed sonic sensors not blocked by the one sonic sensor in the circular array.

In other described embodiments, the plurality of sonic sensors are arranged in outer and inner arrays, the direction processing means including blocking means effective, upon the detection of a sonic impulse by one of the sensors in the outer array, to block the outputs of all the remaining sensors except that of at least one of the sensors in the inner array closest to the detecting outer sensor.

According to a still further aspect of the invention, the system further includes additional sonic sensor means to be located at the source of the sonic impulse, and means for determining the time elapse between the detection of the sonic impulse by the additional sonic sensor means and by the array of sonic sensors located at the reference body, and thereby for computing the distance of the source of sonic impulse from the reference body.

As will be more apparent from the description below, systems including the foregoing features may be constructed to occupy a relatively small volume so as to be capable of being carried on the body of a person or in a relatively small vehicle, as well as in larger vehicles such as aircraft or seacraft. In addition, such systems may be constructed to have a relatively low rate of false alarms.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figures 1, 2, 3:
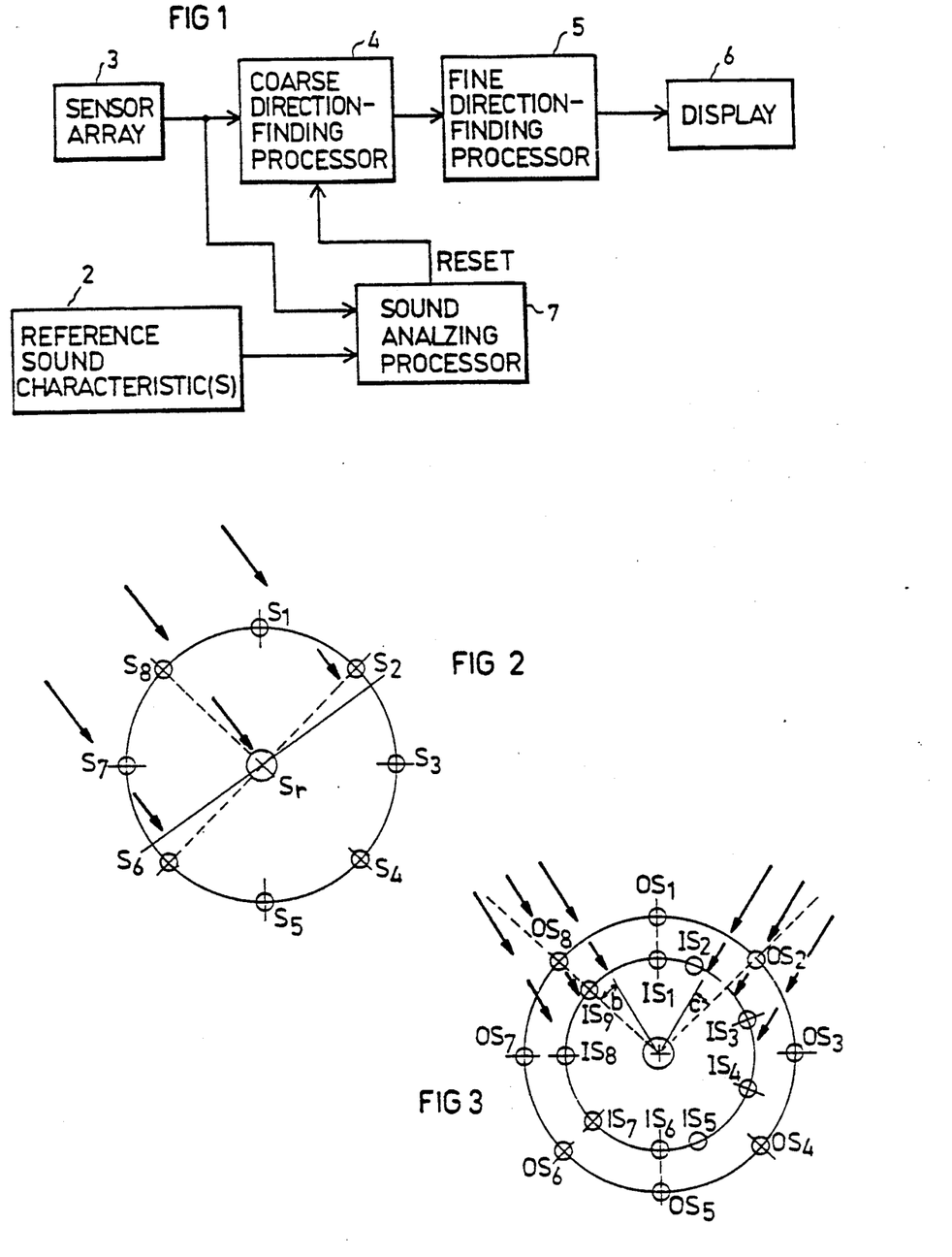
FIG. 1 is a block diagram illustrating one form of sonic direction locating system constructed in accordance with the present invention.
FIGS. 2 and 3 illustrate two different types of arrays of sonic sensors that may be included in the system of FIG. 1.

With reference to the block diagram of FIG. 1, there is illustrated a sonic direction locating system for locating the direction of the origin of a specified type of sonic impulse with respect to a reference body. The system illustrated in FIG. 1 is to be carried by, or to be located adjacent to, the reference body. A main advantage of the system is that it may be constructed in very compact form to occupy a relatively small volume, enabling it to be carried on a person or on a relatively small vehicle, but the invention can also advantageously be used with respect to larger bodies, such as relatively large vehicles, aircraft, seacraft, fixed installations, and the like. The specified type of sonic impulse whose origin is to be located is defined by a plurality of predetermined sound characteristics stored in a storage device 2.

The system illustrated in FIG. 1 includes a plurality of sonic sensors 3 arranged in a predetermined array to be located on the reference body. Direction processing means, constituted of a course direction-finding processor 4 and a fine direction-finding processor 5, processes the outputs of the sensor array 3 in order to determine the direction of the origin of the sonic impulse detected by them, which direction is displayed in a display 6. The system illustrated in FIG. 1 further includes a sound analyzing processor 7 connected to receive the output of at least one of the sonic sensors in the array 3, and to analyze that output to see whether it matches the predetermined characteristics stored in the storage device 2. Whenever a characteristic of the detected sound does not substantially match the corresponding characteristic stored in the storage device 2, processor 7 outputs a reset signal to the coarse direction-finding processor 4 which resets the processor and thus disables the system from further processing the detected sound.

FIG. 2 illustrates one form of array 3 of sonic sensors that may be used in the system of FIG. 1. Array 3 includes eight sonic sensors $S_1-S_8$ arranged in a circular array at 45° intervals, and a center sensor $S_r$ serving as a reference sensor. All the sensors $S_1-S_r$ are e.g., omnidirectional sensors. The circular array illustrated in FIG. 2 is particularly useful with the coarse direction-finding processor 4 (FIG. 1) illustrated in FIG. 4 for detecting the direction o the origina of the sonic impulse. The center sensor $S_r$ is an optional sensor which may be used in the sound analyzing processor (7, FIG. 1) for analyzing the detected sound impulse in order to determine whether its characteristics match those stored in the storage device 2 representing the desired sound to be detected.

FIG. 3 illustrates another form of sensor array, therein designated 3', wherein the sensors are arranged in outer and inner arrays. In the example illustrated in FIG. 3, there is an outer circular array of eight sensors $OS_1-OS_8$, and an inner circular array of e.g., nine sensors $IS_1-IS_9$. When such a sensor array is used, the direction-finding processor (e.g., 4, FIG. 1) is effective, upon the detection of a sonic impulse by one of the outer sensors, to block the outputs of all the remaining sensors except the one, two or three sensors of the inner array closest to the detecting outer sensor. FIG. 3 also illustrates a central sensor $S_r$ centrally of both circular arrays of sensors, which, as in FIG. 2 may be used for producing the signal analyzer by the sound analyzing processor 7 (FIG. 1).

Figure 7:
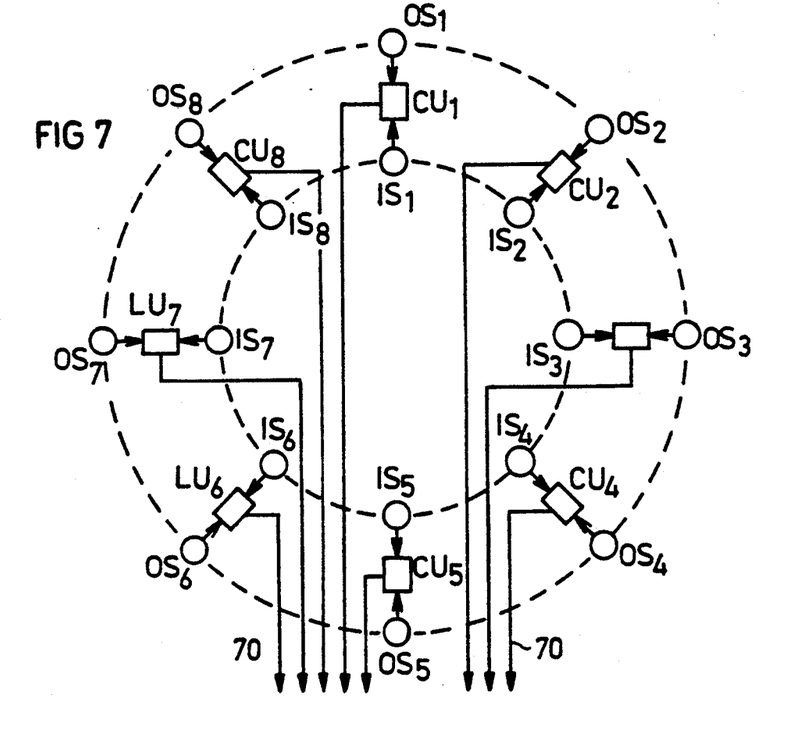
FIG. 7 illustrates another type of sensor array, similar to that of FIG. 3, which may be used in the system of FIG. 1.

FIG. 7 illustrates a variation wherein both arrays include the same number of sensors, the sensors being arranged in the form of a plurality of pairs, with each sensor in radial alignment with the other sensor of the pair. As will be described below, an outer sensor detecting the sonic impulse will be effective to block all the remaining sensor except the one in radial alignment with it.

Figure 4:
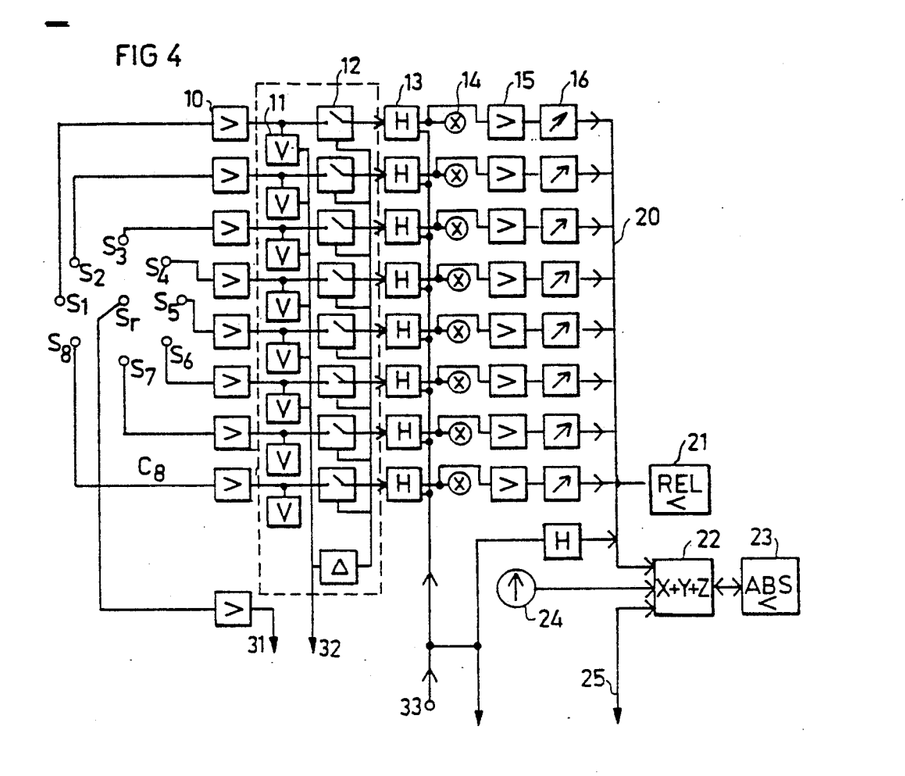
FIG. 4 illustrates one design of a coarse direction-finding processor in the system of FIG. 1, the processor being shown as connected to the sensor array of FIG. 2.

FIG. 4 illustrates one form of coarse direction-finding processor 4 (FIG. 1) particularly useful with the sensor array 3 of FIG. 2. As shown in FIG. 4, the coarse direction-finding processor 4 includes a plurality of channels, designated $C_1-C_8$, each connected to one of the sensors $S_1-S_8$ of the sensor array 3. Each channel includes a channel amplifier 10, a buffer amplifier 11, an electronic blocking switch 12, a holding circuit 13, a light indicator 14, another buffer amplifier 15, and a coded converter 16 which converts the voltage outputted by the respective channel to an angle corresponding to the position of the respective sensor in the array. A delay circuit 17, common to all the channels $C_1-C_8$, is connected to the outputs of the buffer amplifers 11 of all the channels and controls all the electronic blocking switches 12 after a predetermined time delay, as will be described more particularly below.

The outputs of all the channels $C_1-C_8$ are summed in an output line 20, which is connected to a coarse-angle display 21, and also to a summation circuit 22 whose output is connected to an absolute angle display 23.

Summation circuit 22 receives not only the output of the output circuit 20, but also the output of a compass 24 which feeds an electrical signal to summation circuit 22 indicating the position of the object carrying the direction locating system with respect to the true North. Circuit 22 includes a further input, via line 25, from the fine direction-finding processor 5 (more particularly illustrated in FIG. 5), so that the angle displayed in display 23 is the precise absolute angle of the reference object carrying the locating system with respect to true North.

The coarse direction-finding processor illustrated in FIG. 4 operates as follows:

As soon as one of the sensors $S_1-S_8$ detects a sonic impulse, it outputs a pulse to its respective channel $C_1-C_8$. This pulse is amplified (at 10), buffered (at 11), and held in its holding circuit 13. After a predetermined short time delay, as fixed by delay circuit 17 to be sufficient to feed the output of the respective sensor to its holding circuit, delay circuit 17 actuates the blocking switches 12 of all the channels. Accordingly, only the channel connected to the detecting sensor will be effective. The effective channel will energize its indicator lamp 14 and will also output in the output circuit 20 a voltage indicating the angle of the respective sensor in the array. This angle, will also be displayed in display 21 and in the absolute display 23 to indicate the angle with respect to true North.

Figure 5:
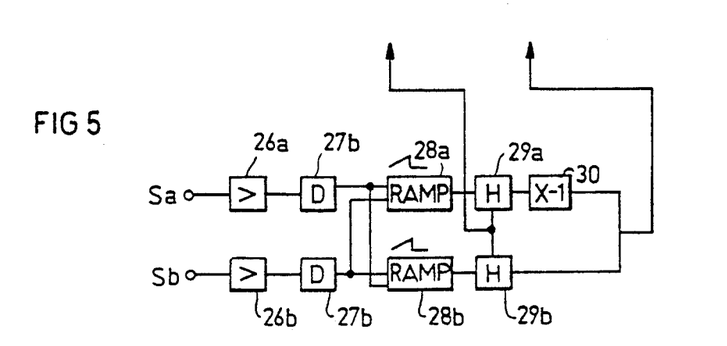
FIG. 5 illustrates one design of fine direction-finding processor in the system of FIG. 4 for use with the sensor array of FIG. 2.

However, when the fine direction-finding processor illustrated in FIG. 5 is included, not all the channels will be blocked upon the detection of a sonic impulse by one of the sensors $S_1$–$S_8$, but rather the two channels of the diametrically-opposite sensors located 90° from the detecting sensor in te circular array, will be not blocked. Such diametrically-opposite sensors are indicated at $S_a$, $S_b$ in FIG. 5. Their outputs are amplified as shown at 26, differentiated (peaked) at 27, and applied to a ramp generator 28 which converts the time delay between the detection of the sonic impulse by the two sensors $S_a$, $S_b$ into a voltage. The two ramp circuits 28, 29 are interconnected such that the first sensor of the two to detect the sonic impulse starts its ramp circuit 28 and stops the ramp circuit of the other detector. Thus, only one of these two channels is enabled, and its output will be a linearly-increasing voltage corresponding to the time between the detection of the sonic impulse by the first of the two detectors and the detection of the other of the two detectors.

One of the output channels, namely that of sensor $S_a$, is inverted, as shown by inverter 30. The outputs of both channels are applied to the output line 25 of the fine direction-finding processor for inputting into the summation circuit 22, as a positive (or negative) value to be added (or subtracted) from the other two inputs, namely the coarse directionfinding processor output line 20 and the compass output line 24. Accordingly, the output from the summation circuit 22 to the absolute angle display 23 will be a precise angle with respect to North indicating the origin of the sonic impulse detected by the sensor array 3.

While FIG. 5 illustrates an analog circuit, it will be appreciated that the same functions can be performed by a digital circuit.

As shown in the block diagram of FIG. 1, the outputs of the sensor array 3 are also fed to the sound analyzing processor 7 to determine whether certain predetermined characteristics of the sonic impulses detected by the sensors match the specific type of sonic impulses desired to be detected as stored in the storage device 2. The sound analyzing processor 7 is connected to the direction-finding processor illustrated in FIG. 4 either via lead 31 from the reference sensor $S_r$, or via lead 32 from the channels of the other eight sensors. The second analyzing processor could also be included in each channel, e.g., after the buffer amplifier, but in such case it would preferably be a digital circuit.

Whenever an examined characteristic of the detected sonic impulse does not match the corresponding characteristic stored in the storage device 2, the sound analyzing processor (7, FIG. 1) produces a reset pulse which is applied via lead 33 to the coarse direction-finding processor of FIG. 4 to reset the processor, and thereby to disable it from further processing the detected sonic impulse.

Figure 6:
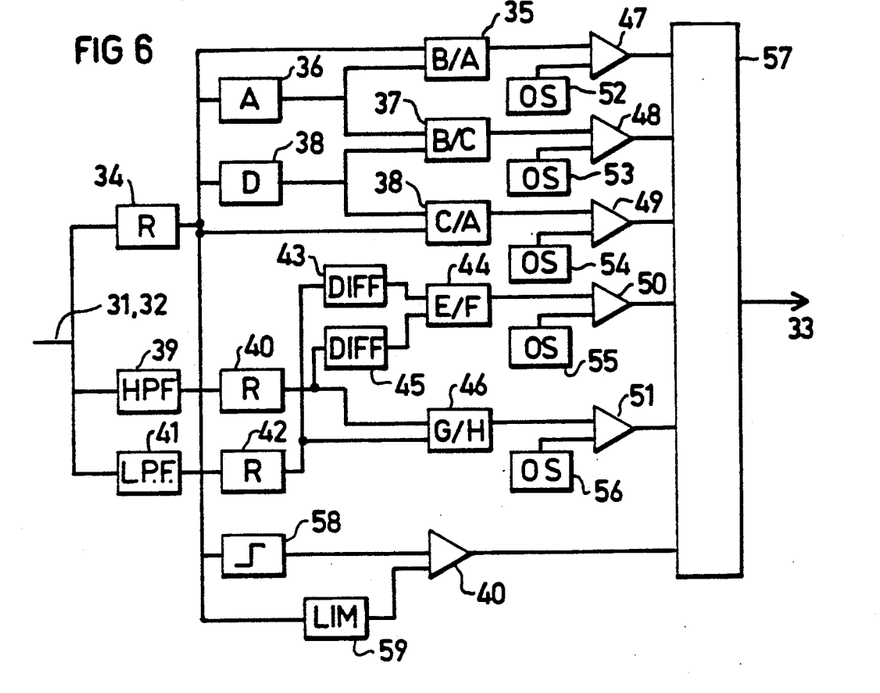
FIG. 6 illustrates one form of sound analyzing processor in the system of FIG. 1.

FIG. 6 illustrates one form of sound analyzing processor 7 that may be used. The sound analyzing processor of FIG. 7 receives either the output of the reference sensor Sr via input lead 31, or the outputs of the amplifiers 11 for all the sensors $S_1$–$S_8$ via input lead 32, or the output from the buffer amplifier 10 of each channel $C_1$–$C_8$, when a separate processor is used for each channel. The signal inputted into the processor of FIG. 7 is analyzed as follows:

A part of the signal is rectified in rectifier 34 and is applied as signal A to one input of a divider 35. Another part of the rectified input signal A is applied to an averager 36 and is applied as signal B to the other input of divider 35, and also to one input of another divider 37. A further part of the rectified input signal A is applied to a differentiator 38, and the time derivative is applied as signal C to the other input of divider 37, and to one input of a further divider 38. The rectified input signal A is applied to the other input of divider 38.

Another part of the signal inputted via lead 31 (or 32) is passed through a high-pass filter 39 to a rectifier 40, and also through a low-pass filter 41 to a rectifier 42. The output of rectifier 42 is fed to a differentiator 43 and its output, referred to as signal E, is fed to one input of a divider 44. The output from rectifier 40 is fed to a differentiator 45 and appears, as signal F, which is fed to the other input of divider 44. The output from rectifier 40 is also fed, as signal G, to one input of a divider 46, the other input to the divider receiving the output, signal H, from rectifier 42.

The outputs from dividers 35, 37, 38, 44 and 46 are applied to comparators 47, 48, 49, 50 and 51, respectively, each comparing the respective characteristic of the detected sound impulse with predetermined characteristics, as stored in the storage device 2, FIG. 1, inputted to the comparators via offset circuits 52–56, respectively. If there is a mismatch between the detected characteristic and the stored characteristic examined by the comparators 47–51, the respective comparator will output a signal to an OR-gate 57, which in turn outputs a signal via lead 33 to reset the direction-finding processor illustrated in FIG. 4.

The detected signal inputted via lead 31 (or 32), as rectified in rectifier 34 and as appearing as signal A, is also applied to a monopulsar 58 which produces a pulse, signal I, corresponding to the maximum duration of the detected impulse. Signal I after passing through a limiter 59, is fed to a gate 60, together with signal A, and if the duration of signal A is too long, a pulse is outputted to the OR-gate 57, and thereby to the reset circuit of FIG. 4 via line 33.

It will thus be seen that the coarse direction-finding processor illustrated in FIG. 4 is reset by a pulse applied to reset lead 33 whenever the detected sonic pulse is found not to match the specified type of sonic pulse as stored in storage device 2 with respect to any one of the following characteristics: the average value of the rectified input signal (B) compared to the rectified input signal (A), as indicated by the output of divider 35; the average value of the rectified input signal (B) as compared to the time derivative of the input signal (C), as indicated by the output of divider 37; the time derivative of the input signal (C) as compared to the rectified input signal (A), as indicated by the output of divider 38; the time derivative of the low frequency component of the input signal (E) as compared to the time derivative of the high frequency component of the input signal (F), as indicated by the output of divider 44; the rectified high frequency component of the input signal (G) as compared to the rectified low frequency component of the input signal (H), as indicated by the output of divider 46; and the time duration of the input signal (A) being greater than a specified maximum time duration, as indicated by the output of gate 60. As described above, any of the above mismatches will automatically reset the direction finding processor illustrated in FIG. 4 via its reset terminal 33.

FIG. 7 illustrates another type of array of sonic sensors which may be used for the sensor array 3 in FIG. 1. The sensor array illustrated in FIG. 7 also includes two coaxial circles of sensors, as in FIG. 3, except that in FIG. 7 the outer circle of sensors $OS_1$–$OS_8$ and the inner circle of sensors $IS_1$–$IS_8$ are equal in number and are arranged to define eight pairs of sensors, with each sensor of a pair in radial alignment with the other sensor of the pair. Each pair of sensors $OS_1$, $IS_1$–$OS_8$, $IS_8$ is connected to the input of a control unit $CU_1$–$CU_8$, respectively. The outputs 70 of the eight coaxial units are connected to the inputs of the eight channels $C_1$–$C_8$ in the coarse direction-finding processor illustrated in FIG. 4.

FIGS. 8a–8d illustrate four types of circuits which may be used for each of the control units $CU_1$–$CU_8$ in FIG. 7.

Figure 8A:
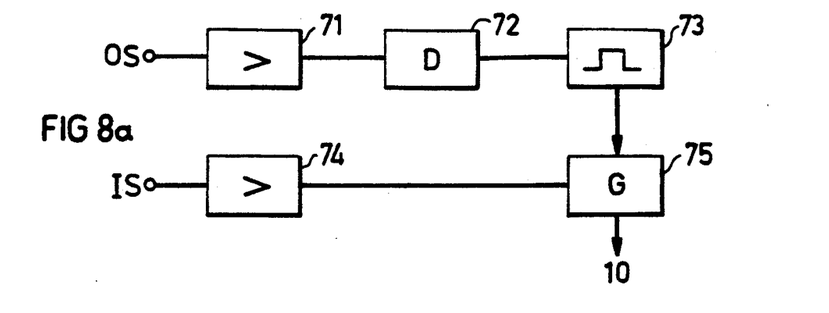
FIGS. 8a-8d illustrate various types of control units which may be used in the sensor array of FIG. 7.

The control unit illustrated in FIG. 8a receives one input from the respective outer sensor OS, which input is amplified at 71, differentiated at 72 to produce a peak at its rising edge, and is used to gate a monopulser 73 to produce a pulse of a predetermined duration. The control unit also includes an input from the respective inner sensor IS, which is amplified at 74 and is then fed to a gate 75 controlled by the output of monopulser 73, so that an output is produced from the respective control unit containing only the portion of the signal from the inner sensor of the pair which is received within a predetermined time period (as fixed by the monopulser 73) of the detection of a sound by the outer sensor OS of the respective pair.

Figure 8B:
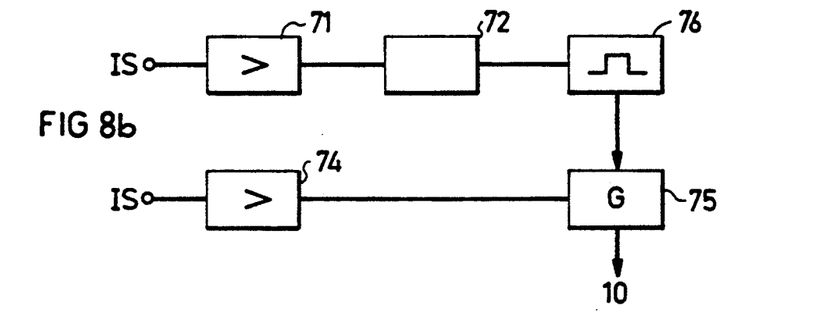

FIG. 8b illustrates a similar circuit to that of FIG. 8a, except instead of using a monpulser in the channel of the outer sensor OS, there is used a delay circuit 76.

Figure 8C:
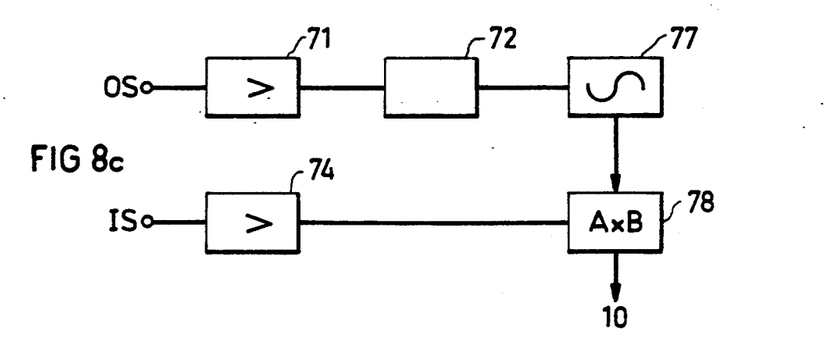

FIG. 8c illustrates a control unit CU wherein the channel of the outer sensor OS includes a weighing function circuit 77, which in turn controls the signal outputted by the respective inner sensor IS so as to produce an output to the respective channel (10, FIG. 4) which is weighed in accordance with the time of the detection of the sound by the inner sensor IS with respect to the outer sensor OS. Thus, the output from the control unit illustrated in FIG. 8c will be a sensitivity control signal which controls the input to the respective channel of the coarse direction-finding processor illustrated in FIG. 4 according to the time of detection of the sound by the inner sensor IS with respect to that of the outer sensor OS.

Figure 8D:
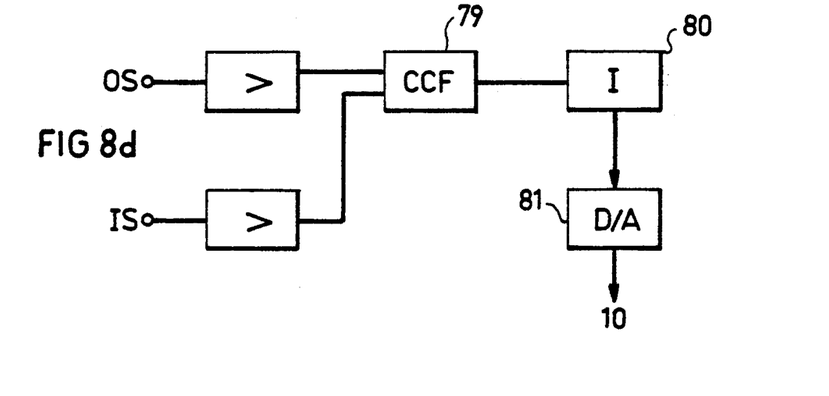

FIG. 8d illustrates a circuit for the control units CU in which the signals outputted by the outer sensor OS and inner sensor IS, after amplification, are both applied to a cross-correlation function circuit 79, which produces an output (e.g, digital) corresponding to an e.g., cross-correlation preprogrammed function of the two inputs. This output is applied to an inverter circuit 80, and then to a digital-to-analog converter 81, before being fed to the input of the respective channel $C_1$–$C_8$ in the coarse direction-finding processor. If the cross-correlation function is not performed digitally, inverter 80 and computer 81 may be omitted.

Figure 9:
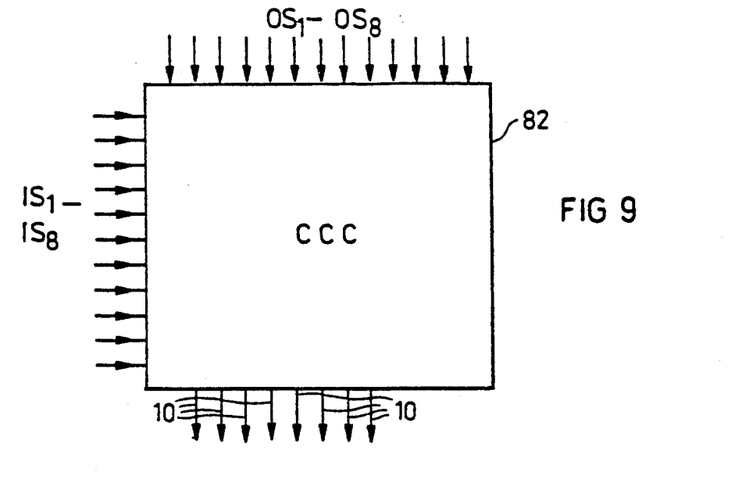
FIG. 9 illustrates an optional modification that may be included in the coarse direction-finding processor of FIG. 4 in order to further reduce the false alarm rate.

FIG. 9 illustrates another control unit which may be used between two groups of sensors, such as the radially-aligned sensors illustrated in FIG. 7, or the non-radially aligned sensors illustrated in FIG. 3. Thus, the outputs of one group of sensors (e.g., the outer sensors OS) are applied to one group of inputs of a coincidence/correlation calculator 82; and the outputs from the other group of sensors (e.g., the inner sensors IS) are applied to another group of inputs to the calculator 82. The calculator 82 is preprogrammed to produce outputs according to a predetermined coincidence-correlation function. These outputs are used as the inputs to the channel $C_1$–$C_8$ (FIG. 4) in the coarse direction-finding processor.

Figure 10:
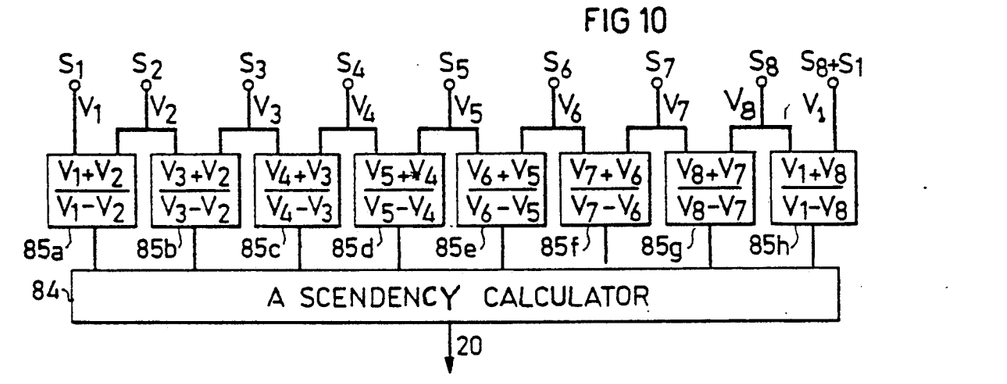
FIG. 10 illustrates another form of coarse direction-finding processor which may be used in the system of FIG. 1, FIG. 10a illustrating the ascendency calculator used in the system of FIG. 10.

FIG. 10 illustrates another form of direction-finding processor which may be used instead of that illustrated in FIG. 3.

Thus, the processor illustrated in FIG. 10 also includes eight channels $C_a$–$C_h$, each connected to receive the output of one of the eight sonic sensors $S_1$–$S_8$. The processor illustrated in FIG. 10 further includes eight dividers 83a–83h, one for each of the eight channels. Each divider divides the sum of the outputs of an adjacent pair of channels by the differences in the outputs of the respective pair of channels. Thus, the first divider $83_a$ receives the inputs $V_1$ and $V_2$ of the two adjacent sensors $S_1$, $S_2$, adds them together, subtracts one from the other, and divides the sum by the difference. The last channel $C_i$ receives the voltages from the first and last sensors ($S_1$, $S_8$), and performs the above addition, subtraction and division with respect to those outputs.

Figure 10A:
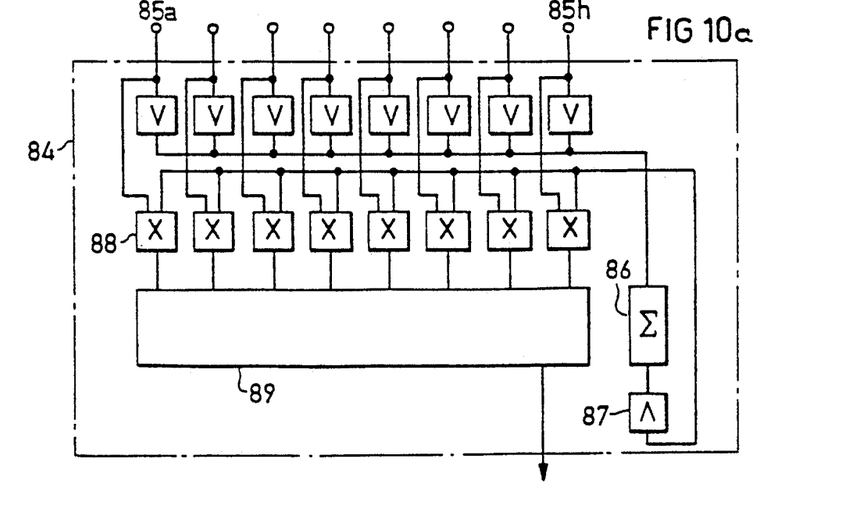

The outputs of all eight dividers are inputted into an ascendency calculator 84. FIG. 10a illustrates one form of ascendency calculator that may be used. As shown in FIG. 10a, the outputs from the divider circuits 83a–85h are applied to buffer amplifiers 85, and then to a summation circuit 86. The output of the summation circuit is applied to a single saw-tooth generator 87, which applies its output, together with the outputs from the dividers 83a–83h, to a multiplier circuit 88, one for each of the eight channels. The outputs from the eight multiplier circuits 88 are fed to a processor 89 which determines which of the latter eight inputs is the highest, and thereby provides an indication of the direction of origin of the detected sonic impulse.

The output of calculator 84 is fed, via the output circuit conductor 20 of FIG. 4, to the relative angle display 21 and also to the summation circuit 22 of FIG. 4 for producing the absolute angle display 23 in that figure.

Figure 11:
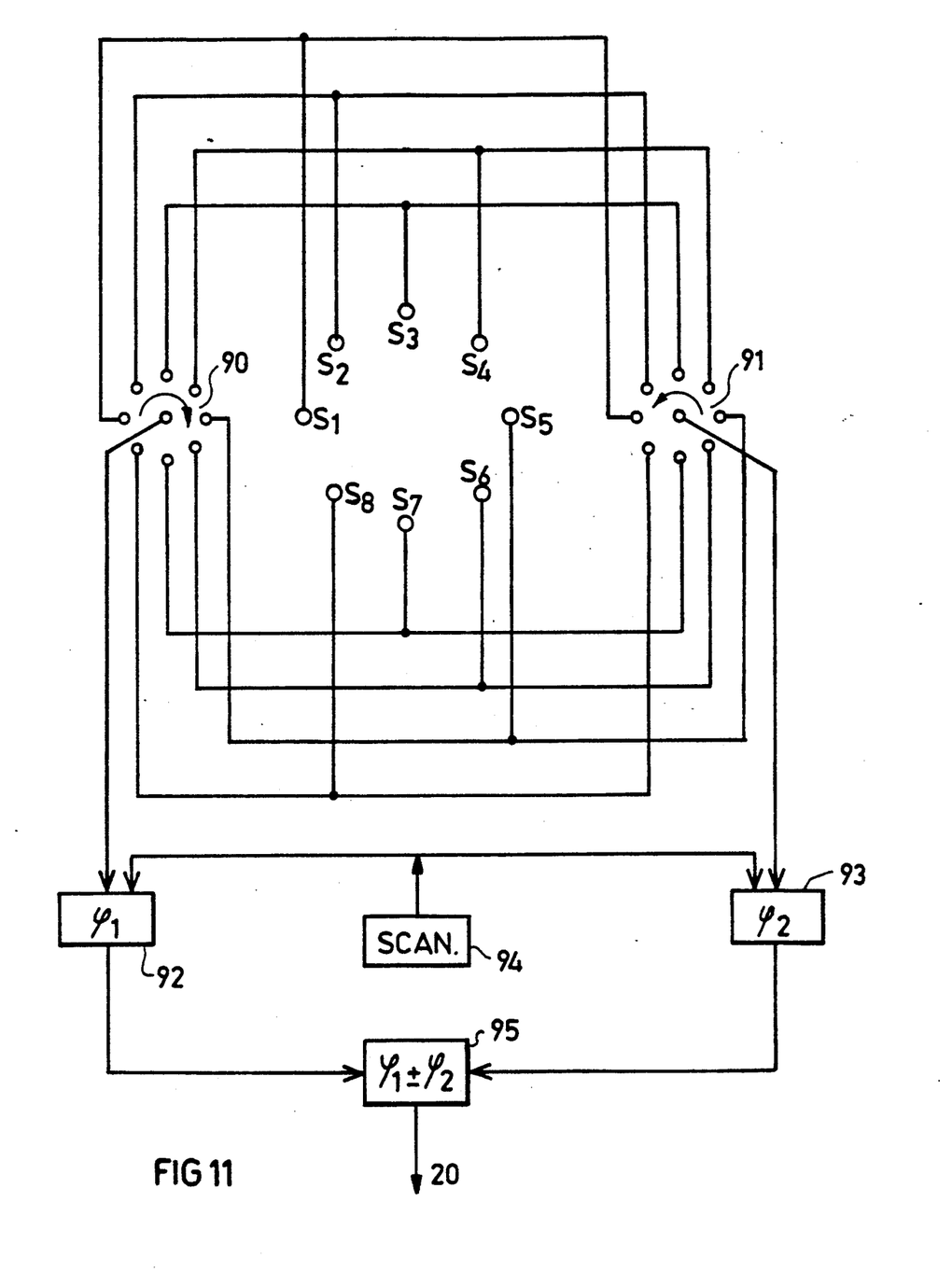
FIGS. 11 and 12 illustrate other forms of coarse direction-finding processors which may be used in the system of FIG. 1.

FIG. 11 illustrates another processor which may be used as the coarse direction-finding processor circuit illustrated in FIG. 4. The processor in FIG. 11 feeds the outputs from the eight sonic sensors $S_1$–$S_8$ to two rotary sampling devices 90, 91. Sampling device 90 samples the outputs of the eight sensors $S_1$–$S_8$ in one circular direction at a predetermined frequency (e.g., 100 KHz) and feeds those outputs to a first phase meter 92; whereas sampling device 91 samples the outputs of the eight sensors in the opposite circular direction at the same frequency at feeds the outputs to a second phase meter 93. The two phase meters 92, 93 are controlled by a scanning reference signal from unit 94 which samples their inputs at the same frequency (e.g., 100 KHz), and feeds their outputs to a summing phase meter 95. The output from the latter meter is applied to output circuit 20 (FIG. 4) and provides an indication of the order of detection of the sonic impulse by the sonic sensors, and thereby the direction of the origin of the sonic impulse according to the positions of the sonic sensors in the array. The information on output line 20 is applied to the relative angle display 21, of FIG. 4, and also to the summation circuit 22 of FIG. 4 for display in the absolute angle display 23.

The above functions can also be done, but with reduced performance, by a circuit utilizing only a single sampling device.

Figure 12:
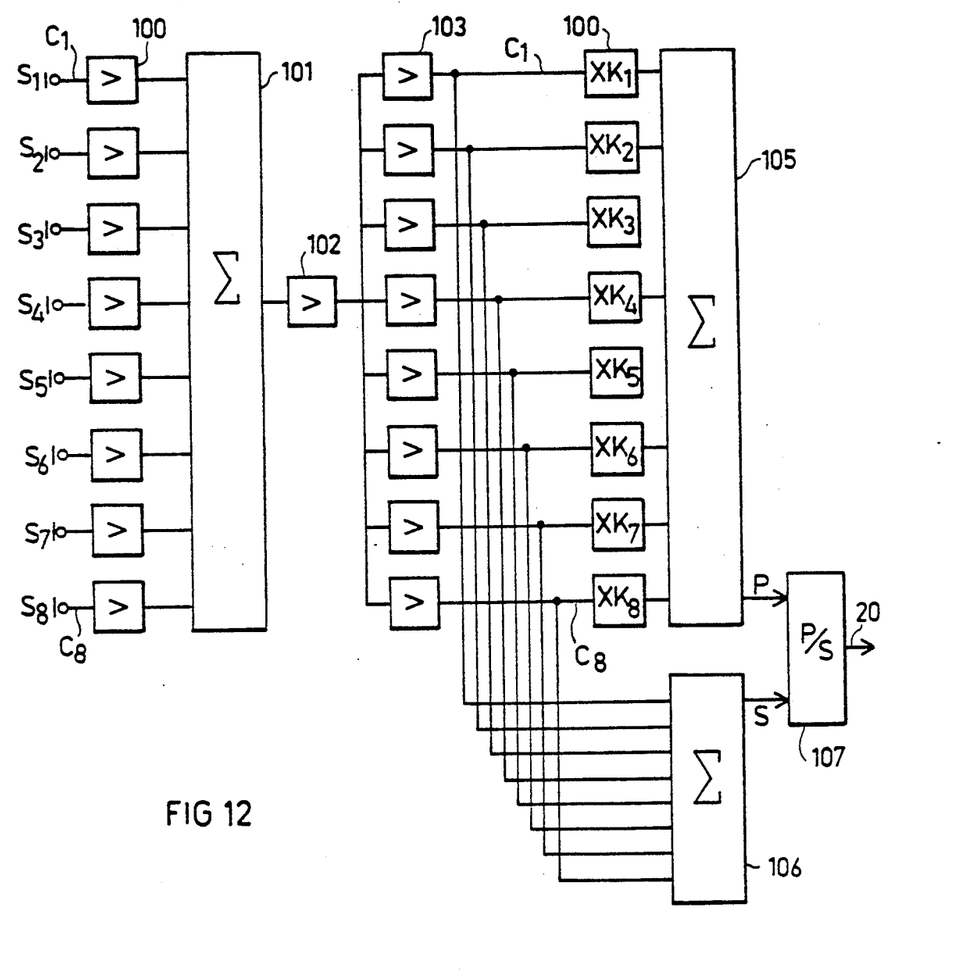

FIG. 12 illustrates a further processor which may be used instead of the coars direction-finding processor illustrated in FIG. 4. The processor illustrated in FIG. 12 also includes the eight channels $C_1$–$C_8$, each receiving the output from one of the sensors $S_1$–$S_8$. Each channel includes a coder or a frequency shifter 100 for coding or shifting the frequency of the output signal from its respective sensor according to a code or a constant-frequency shift corresponding to the position of the sensor in the array.

The outputs of all the channels $C_1$–$C_9$ are applied to a summation circuit 101 which sums these outputs in serial form. These outputs, after after been amplified in amplifier 102, are applied to a decoder or a frequency deshifter circuit 103 for each of the channels $C_1$–$C_8$, for decoding or deshifting the frequency of these signals back to their original form. The decoded or deshifted output signals on channels $C_1$–$C_8$ are then multiplied by a constant factor, in multipliers 104, which varies with the respective channel, and the multiplied outputs are applied to another summation circuit 105. The outputs of channels $C_1$–$C_8$ from the decoder or frequency deshifter units 103 are also applied to a further summation circuit 106 without being multiplied by the constant factors in multipliers 104. A divider 107 receives the output from summation circuit 105 (signal P), and also the output from summation circuit 106 (signal S), and divides the former by the latter (P/S). The output from divider 107 represents the order of detection of the sonic impulse by the eight sonic sensors $S_1$–$S_8$, and thereby the direction of the origin of the sonic impulse according to the positions of the sonic sensors in the array. This output is applied, via output circuit 20 (FIG. 4) to the relative angle display 21 and the summation circuit 22 to the absolute angle display 23.

Whereas FIG. 12 illustrates the combination of a coder or frequency shifter circuit with a multiplier circuit, in many cases it may be desirable to use one of these circuits without the other.

Figure 13:
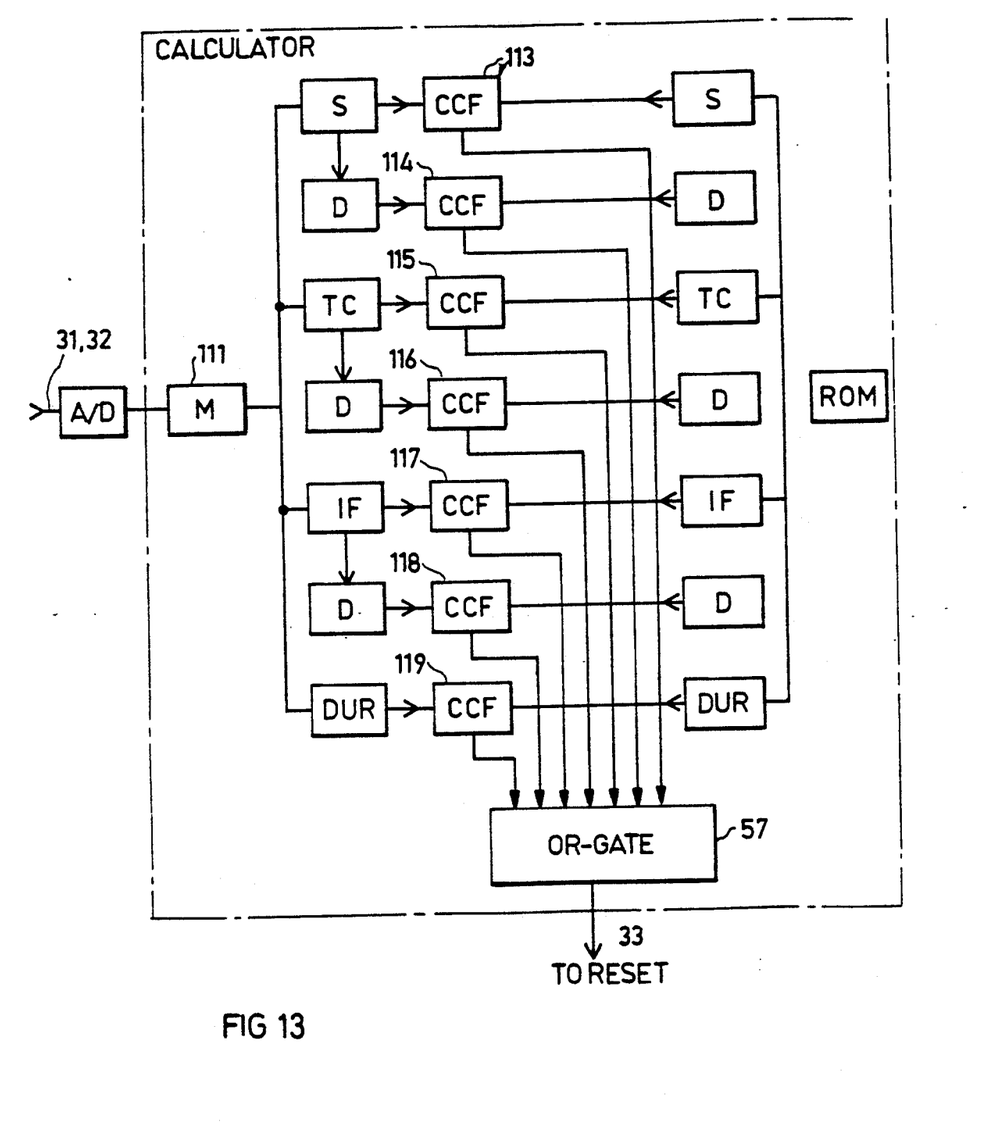
FIG. 13 illustrates another form of sound analyzing processor which may be used in the system of FIG. 1.

FIG. 13 illustrates another type of sound analyzing processor which may be used for processor 7 in the overall system illustrated in FIG. 1, instead of the processor illustrated in FIG. 6. Whereas the processor illustrated in FIG. 6 processes the information in analog form (i.e., up to the outputs of the operational amplifiers 47–51), the processor illustrated in FIG. 13 processes the information in digital form.

Thus, the processor illustrated in FIG. 13 also receives the input signals via input lead 31 (from the reference sensor $S_r$, FIG. 4), or from lead 32 (from the channels of all eight sensors in the array), but immediately converts the signal to digital form via a converter 110, the digital information from the sensor (or sensors) is then stored in a digital memory 111.

The particular characteristics of the type of sound desired to be detected are stored in a second memory 112. Memory 112 thus serves as a reference memory for identifying the specific type of sonic impulse desired to be detected, and since these characteristics depend only on the specific impulse to the be detected, memory 112 may be a ROM (read only memory) having prerecorded therein the particular characteristics of the sonic impulse to be detected, whereas memory 111, receiving the information actually detected by the sensor or sensors, is an RAM (random access memory).

The processor illustrated in FIG. 13 includes seven comparators, e.g., cross-correlation function units 113–119, each of which compares a predetermined characteristic of the detected sonic signal stored in memory 111 with respect to the reference sonic signal to be detected stored in memory 112. Thus, unit 113 compares the spectrum characteristic of the two signals; unit 114 compares the time derivative of the two signals; unit 115 compares the temporal course (i.e., changes in time) of the two signals; unit 116 compares the time derivative (i.e., the peaks) of the temporal course; unit 117 compares the instant frequency of the two signals; unit 118 compares the time derivative of the instant frequency of the two signals; and unit 119 compares the time duration of the two signals.

The outputs of the comparators (e.g., cross-correlation function units) 113-119 are fed to OR-gate 57 (FIG. 6) which, upon detecting a mismatch between any of the compared characteristics of the detected signal with respect to the reference signal, outputs a signal on output line 33 which, as described above, is applied to the reset line 33 in FIG. 4 for resetting the coarse direction-finding processor illustrated in FIG. 4. Accordingly, whenever any mismatch is detected, the direction- finding processor is disabled from further processing the detected signal.

While FIG. 13 illustrates the use of cross-correlation function circuit for determining mismatch, other mathematical functions may be used, e.g., coherence, cross spectrum, or coherence output.

Figure 14:
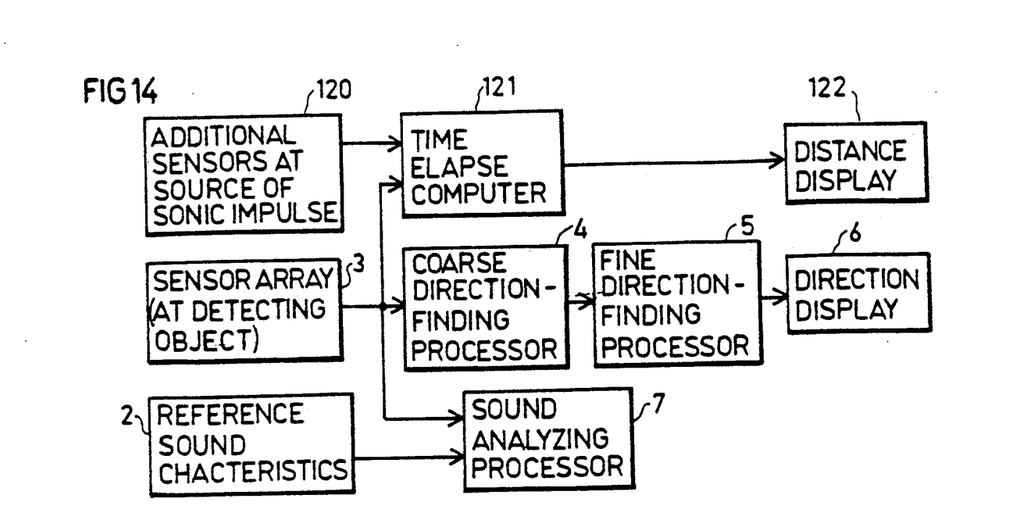
FIGS. 14, 15 and 16 illustrate further modifications that may be included in the system in order to enable it to compute the distance as well as the direction of the sonic impulse.

FIG. 14 illustrates a system for detecting not only the direction of the origin of the sonic impact, but also its distance from the detecting object. Thus, the system illustrated in FIG. 14 includes, in addition to the components illustrated in FIG. 1 which had been similarly numbered to facilitate understand, an addition sensor (or sensors) located at the source of the sonic impulse and connected to one input of a time elapse computer 121. The other input to computer 121 is connected to the sensor array 3 located at the detecting object (e.g., person, or vehicle). Computer 121 computes the time elapse between the detection of the sonic impulses by the two sensor groups 120 and 3, and thereby computes the distance of the source of sonic impulse from the body detecting the impulse. This distance is outputted to a distance display 122, whereby the observer is able to see the direction of the origin of the sonic impact as appearing in display 6, but also the distance to it as appearing in display 122.

Figure 15:
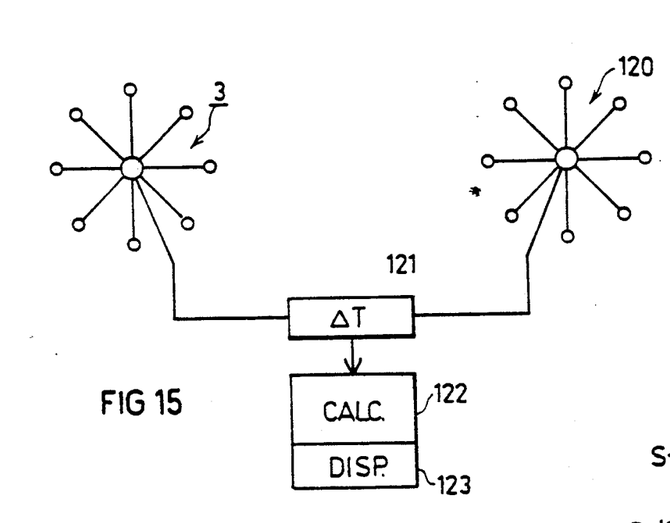
Figure 16:
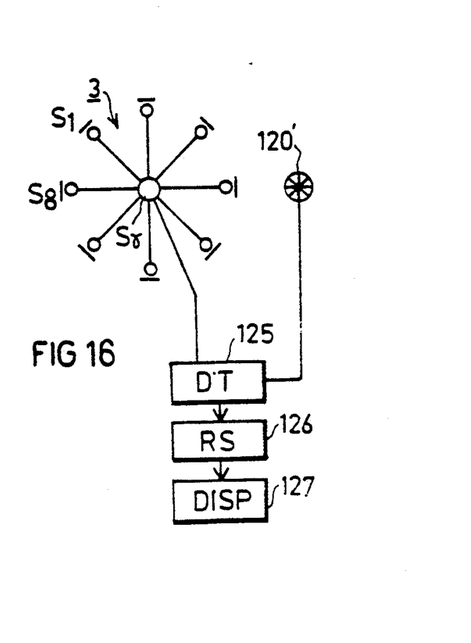

FIGS. 15 and 16 illustrate two types of sensor arrangements that may be used for determining the distance.

FIG. 15 illustrates a system including a sensor array 3 (which may be in any of the forms described earlier) at the detecting location, and an additional sensor array 120, of the same configuration as array 3, at the location of the sonic impulse. The outputs of the two sensor arrays 3, 120, are sampled by a sampling device 121 and are fed to a calculator 122 which, by measuring the time of elapse from the detection of the signals in sensor array 120 to the detection of the signals in sensor array 3, determines the distance between the two sensor arrays. This distance is displayed in display 123.

FIG. 16 illustrates another arrangement utilizing only a single sonic sensor, therein designated 120', to be located at the source of the sonic impulses. Sensor 120' is of a different type, e.g., an accelerometer, from the sensors of the array 3 and may be buried in the ground at the location of the origin of the souce impulse to be detected. The array of sensors 3 at the detecting location may include any of the above-described arrays, but in this case only one of the sensors is used for determining the distance between the source of the sonic impact and the object detecting the sonic impact. The single sensor used in array 3 may be any one of the sensors $S_1$-$S_8$ in the circular array, or may be the reference sensor $S_r$ at the center of the array, since all the sensors are at filed locations with respect to each other.

The outputs of the detecting sensor in array 3 at the detecting location, and sensor 120' at the sonic impulse location, are applied to a time difference calculator which calculates the difference in time between the two signals, which calculated time, after properly scaled by a range scaling device 126, is displayed in the distance display 127.

While the invention has been described with respect to several preferred embodiments, it will be appreciated that many other variations, modifications and applications of the invention may be made. For example, the invention may also be used for underwater devices, like sonars, or in geophysical devices in the ground.

What is claimed is:

1. A sonic direction locating system for locating the direction of origin of a specified type of sonic impulse with respect to a reference body, comprising:
   a plurality of sonic sensors arranged in a predetermined array to be located at said reference body;
   direction processing means for processing the outputs of said sonic sensors to determine the direction of a sonic impulse detected by the sonic sensors according to the positions in said array of the sonic sensors detecting the sonic impulse;
   storage means for storing predetermined characteristics of the specified type of sonic impulse to be located;
   sound analyzing means connected to receive the outputs of said sonic sensors for analyzing same for said predetermined characteristics thereof; and
   disabling means for disabling the direction processing means immediately in response to a determination by the sound analyzing means that one of said predetermined characteristics of the detected sonic impulse does not correspond to that of the specified sonic impulse stored in said storage means.

2. The system according to claim 1, wherein said direction processing means includes means effective, upon the detection of a sonic impulse by one of said sonic sensors, to block the outputs of at least some of said sonic sensor from being processed by the direction processing means.

3. The system according to claim 1, wherein said plurality of sonic sensors are arranged in a circular array; said direction processing means including means effective, upon the detection of a sonic impulse by one of the sonic sensors, to block the outputs of all the other sonic sensors except the two diametrically opposite sensors located 90° from said one sonic sensor in the circular array.

4. The system according to claim 3, wherein said direction processing means comprises:
   a coarse-direction processor for determining the coarse direction of the detected sonic impulse according to the position in said array of said one sonic sensor first detecting the sonic impulse;
   and a fine-direction processor for determining the fine direction of the detected sonic impulse according to the outputs of said two diametrically-opposed sonic sensors not blocked by said one sonic sensor in the circular array.

5. The system according to claim 4, wherein said fine-direction processor includes:
   means for measuring the difference in the times of detection of the sonic impulse by said two diametrically-opposed sonic sensors;
   and means for modifying the output of said coarse-direction processor by said time difference.

6. The system according to claim 1, wherein said plurality of sonic sensors are arranged in outer and inner arrays, said direction processing means including blocking means effective, upon the detection of a sonic impulse by one of the sensors in the outer array, to block the outputs of all the remaining sensors except that of at least one of the sensors in the inner array closest to the detecting outer sensor.

7. The system according to claim 6, wherein said outer and inner sensors are arranged in a plurality of pairs of radially-aligned sensors, each sensor of a pair being connected to the other sensor of the pair by a control means effective to control the output of the inner sensor of the pair in response to the detection of a sonic impulse by the outer sensor of the pair.

8. The system according to claim 7, wherein said control means is effective to block the output of said radially-aligned inner sensor if its output does not appear within a predetermined time delay period with respect to the detection of the sonic impulse by the outer sensor of the pair.

9. The system according to claim 7, wherein said control means is effective to vary the weight of the output of said radially-aligned inner sensor according to the degree of its coincidence with the detection of the sonic impulse by the outer sensor after a predetermined time delay.

10. The system according to claim 7, wherein said control means includes correlation means effective to combine the outputs of the outer detecting sensor and its radially-aligned inner sensor according to a predetermined function of the two outputs.

11. The system according to claim 1, wherein said system further includes a programmed coincidence correlation calculator for receiving the outputs of all said sensors and for feeding them to the direction processing means according to the coincidence correlation of said calculator.

12. The system according to claim 1, wherein said direction processing means comprises:
   a plurality of channels, one for each of said sensors, each of said channels including a buffer amplifier for buffering the input to its respective channel, and a holding circuit for holding the output of its respective buffer amplifier;
   a blocking circuit effective, after a predetermined time delay following the first detection of a sonic impulse by one of the sensor sufficient to feed its output to the holding circuit in its respective channel, to block all the channels;

and a summation circuit summing the outputs of all said channels.

13. The system according to claim 12, wherein each of said channels further includes a visual indicator for indicating the channel of the sensor first detecting the sonic impulse, and thereby the direction of the origin of said sonic impulse according to its position in said array.

14. The system according to claim 12, wherein each of said channels further includes a signal generator for generating a signal corresponding to the position of its sensor in said array and for outputting said signal to said summation circuit.

15. The system according to claim 12, further including a compass for feeding an electrical signal to said summing circuit indicating the position of the reference object with respect to true North.

16. The system according to claim 1, wherein said direction processing means comprises a plurality of channels, one for each pair of adjacent sensors;

each channel including divider means for dividing the sum of the outputs of the respective pair of sensors by the difference in the outputs of the respective pair of sensors;

and means for determining the relative values of the outputs of said divider means, in relation to the order of detection of the sonic impulse by the sensors, to provide an indication of the direction of the origin of the sonic impulse according to the positions of the sensors in said array.

17. The system according to claim 1, wherein said direction processing means comprises:

sampling means for sampling the outputs of said sensors at a predetermined frequency and for feeding the samples to a phase meter; the output of said phase meter providing an indication of the direction of the origin of the detected sonic impulse.

18. The system according to claim 1, wherein said direction processing means comprises:

first sampling means for sampling the outputs of said sensors in one circular direction at a predetermined frequency and for feeding the samples to a first phase meter;

second sampling means for sampling the outputs of said sensors in the opposite circular direction at said predetermined frequency and for feeding the samples to a second phase meter;

and means for summing the outputs of the two phase meters to provide an indication of the order of detection of the sonic impulse by the sensors and thereby the direction of the origin of the sonic impulse according to the positions of the sensors in said array.

19. The system according to claim 1, wherein said direction processing means comprises:

a plurality of channels, one for each of said sensors, each channel including a coder for coding the output signal from its respective sensor according to a code corresponding to the position of the sensor in the array;

a first summation circuit for summing the outputs of all the channels;

a decoder for decoding the outputs of said summation circuit;

a second summation circuit for receiving the outputs of said decoder;

a third summation circuit for receiving the outputs of said sensors;

and a divider circuit for dividing the output of said second summation circuit by the output of said third summation circuit.

20. The system according to claim 1, wherein said direction processing means comprises:

a plurality of channels, one for each of said sensors, each channel including a frequency shifter for shifting the frequency of the output signal from its output sensor a predetermined frequency shift corresponding to the position of the sensor in the array;

a first summation circuit for summing the outputs of all the channels;

a frequency deshifter for deshifting the outputs of said summation circuit back to the original frequencies;

a second summation circuit for receiving the outputs of said frequency deshifter;

a third summation circuit for receiving the outputs of said sensors;

and a divider circuit for dividing the output of said second summation circuit by the output of said third summation circuit.

21. The system according to claim 1, wherein said sound analyzing means includes an input circuit for receiving an input signal corresponding to the outputs of all said sensors via said direction processing means, and means for analyzing said input signal for said predetermined characteristic.

22. The sytem according to claim 1, wherein said sound analyzing means includes an input circuit for receiving an input signal corresponding to the output of one of said sensors independently of said direction processing means, and means for analyzing said input signal for said predetermined characteristics.

23. The system according to claim 21, wherein said predetermined characteristics include the average value of the rectified input signal compared to the rectified input signal.

24. The system according to claim 21, wherein said predetermined characteristics include the average value of the rectified input signal compared to the time derivative of the input signal.

25. The system according to claim 21, wherein said prederermined characteristics include the time derivative of the input signal compared to the rectified input signal.

26. The system according to claim 21, wherein said predetermined characteristics include the time derivative of the low-frequency component of the input signal compared to the time derivative of the high-frequency component of the input signal.

27. The system according to claim 21, wherein said predetermined characteristics include the rectified high-frequency component of the input signal compared to the rectified low-frequency component of the input signal.

28. The system according to claim 21, wherein said predetermined characteristics include the time duration of the input signal compared to a maximum predetermined time duration.

29. The system according to claim 21, wherein said input circuit to the signal analyzing means is an analog circuit, and said analyzing means analyzes said predetermined characteristic by comparing the level of the value representing it with a reference value stored in said storage means.

30. The system according to claim 21, wherein said input circuit to the signal analyzing means includes an analog-to-digital converter for converting the value representing said predetermined characteristic to digital form, and said storage means for storing said at least one predetermined characteristic of the specified type of sonic impulse to be located is a digital memory.

31. The system according to claim 1, further including additional sonic sensor means to be located at another location and means for determining the time elapse between the detection of the sonic impulse by said additional sonic sensor means and by said array of sonic sensors located at the reference body, and thereby for computing the distance of said source of sonic impulse from the reference body.

32. The system according to claim 31, wherein said additional sonic sensor means is a single sonic sensor of a different type from the sensors of the array, to be located at or near the reference body.

33. The system according to claim 31, wherein said additional sonic sensor means includes a plurality of sonic sensors to be located separated in a certain distance from the reference body arranged in an array corresponding to the plurality of sonic sensors to be located at the reference body.

* * * * *